Patented Nov. 9, 1943

2,333,634

UNITED STATES PATENT OFFICE 2,333,634

COPOLYMERIZATION OF VINYL HALIDES WITH VINYLIDENE HALIDES

Edgar C. Britton, Midland, Mich., and Clyde W. Davis, Pittsburg, Calif., assignors to The Dow Chemical Company, Midland, Mich., a corporation of Michigan No Drawing. Application August 3, 1940, Serial No. 351,224

7 Claims. (Cl. 260—86)

This invention concerns an improved method of polymerizing vinyl halides together with vinylidene halides, i. e. of co-polymerizing these two types of compounds. By a "vinylidene halide" we mean an asymmetric dihalo-ethylene.

A co-pending application of J. W. Britton and R. C. Dosser, Serial No. 351,220, filed concurrently herewith, discloses certain new complex catalysts comprising an acid, a peroxide, and a ferric compound and shows them to be more effective in promoting the polymerization of vinyl-compounds than are any of their ingredients. The same application discloses that the polymerization of a vinyl halide with such complex catalyst may be carried out in the presence of a mutual solvent for the vinyl halide and the catalyst, or in aqueous emulsion, but that it occurs more rapidly when carried out in solution than when carried out in emulsion.

We have now found that the co-polymerization of vinyl halides with vinylidene halides using the complex catalysts occurs far more rapidly and completely when carried out in aqueous emulsion than when carried out in solution, as recommended in said co-pending application. We have further found that the co-polymer formed when the catalytic co-polymerization of a vinyl halide and the corresponding vinylidene halide is carried out in aqueous emulsion is of more uniform quality than is that obtained by carrying the co-polymerization out in other ways. By this we mean that when the co-polymerization is carried out at a constant temperature in aqueous emulsion with the above-mentioned complex catalyst, the co-polymer formed at the start of the reaction usually corresponds closely in composition with that formed at later stages of the reaction. In contrast, when the co-polymerization is carried out in other ways, e. g. without catalyst or using catalysts other than the above-mentioned new complex catalysts, as disclosed in U. S. Patent No. 2,160,931, the co-polymer initially formed seldom corresponds closely in composition with that formed in later stages of the polymerization. Also, the molecular ratio of vinyl halide to vinylidene halides chemically combined in the co-polymer product corresponds more closely to the ratio in which the vinyl halide and vinylidene halide are employed as reactants to form said co-polymer, when the polymerization is carried out in the presence of the complex catalyst (comprising an acid, a per-oxygen compound, and a ferric compound) than when carried out in the absence of said catalyst under otherwise similar conditions. We have further observed that when carrying the catalytic co-polymerization out in aqueous emulsion, the reaction occurs smoothly and rapidly regardless of the relative proportions of vinyl halide and vinylidene halide used. When carrying the co-polymerization out in solution, satisfactorily rapid reaction is obtained only when the vinyl halide is in molecular excess over the vinylidene halide, i. e. if the latter is used in molecular excess it retards greatly the rate of reaction.

As hereinbefore indicated, the complex catalysts employed to promote the polymerization comprise as their essential ingredients an acid, a per-oxygen compound capable of supplying nascent oxygen to the polymerization mixture, and a ferric compound. The kinds and the proportions of acid, per-oxygen compound, and ferric compound employed as catalyst ingredients may be varied widely. Any water-soluble acid of strength sufficient to render the emulsified reaction mixture definitely acidic may be used as the acid ingredient. Examples of such acids are nitric acid, hydrochloric acid, sulphuric acid, benzene sulphonic acid, acetic acid, chloro-acetic acid, etc. The acid is employed in amount sufficient to reduce the pH value of the emulsion to below 6, and preferably to between 1.5 and 3. Best results are usually obtained when employing nitric acid in the proportions just stated as the acid ingredient of the catalyst. However, in polymerizing readily hydrolyzable vinyl compounds, e. g. vinyl acetate or other vinyl esters, a weaker acid such as acetic acid is preferably used so as to avoid possible hydrolysis of the vinyl compound.

Any peroxide which is soluble in, or readily emulsifiable with water may be used as a catalyst ingredient, but hydrogen peroxide is preferred. Other per-oxygen compounds which may be used are benzoyl peroxide, sodium or potassium perborate, peracetic acid, and metal peroxides such as sodium or barium peroxide which may be reacted with the acid to form hydrogen peroxide in situ, etc. Between 0.002 and 0.2 mole of peroxide is usually employed per mole of the compounds to be polymerized, but the peroxide may be used in other proportions if desired.

Examples of ferric compounds which may be employed as catalyst ingredients are ferric nitrate, ferric chloride, ferric sulphate, ferric acetate, ferric salts of sulphonic acids such as benzene sulphonic acid, toluene sulphonic acid, sulphonated sperm oil, etc. Apparently any ferric compound which is soluble or emulsifiable with water may be employed. The proportion of ferric compound is preferably very small, between 0.0001 and 0.05 per cent by weight of iron relative to the vinyl compound usually being employed, although smaller or somewhat larger proportions may be used.

It will be noted from the foregoing statements that the proportions of the several catalyst ingredients with respect to one another may be varied over wide ranges. However, we usually employ the ferric compound and the peroxide in relative proportions corresponding to between about 0.000001 and 0.0004 gram atom of iron per mole of the peroxide. As hereinbefore stated, the acid is advantageously used in amount sufficient to lower the pH value of the reaction mixture to below 6 and preferably to between 1.5 and 3.

In preparing the emulsified reaction mixture the vinyl halide and vinylidene halide and the essential catalyst ingredients in the proportions hereinbefore stated are mixed in any desired order with water and an emulsifying agent and the mixture is agitated to effect emulsification. The identity of the emulsifying agent is of secondary importance provided, of course, that it is one forming stable emulsions with the acidic mixture required by the invention. A number of suitable emulsifying agents are well known. Among the various emulsifying agents which may be used are egg albumen and alkali metal sulphonate of aliphatic or alkyl-aromatic hyrdocarbons of high molecular weight. Nopco (a sodium salt of sulphonated sperm oil) is particularly well adapted to use as the emulsifying agent. The proportion of emulsifying agent required is usually small, e. g., Nopco, when used, is preferably employed in amount corresponding to between 0.1 and 2.5 per cent of the weight of the water.

The emulsion is brought to a temperature sufficient to cause rapid polymerization of the vinyl compound, the preferred temperature being dependent upon the particular vinyl compound under treatment. In most instances the polymerization occurs rapidly and smoothly at temperatures between 20° and 100° C., and in some instances it may be carried out rapidly at temperatures as low as —10° C. The polymerization is preferably carried out in a closed container under the vapor pressure of the mixture, but when operating at the lower reaction temperatures, e. g. 5° C. or lower, it may be carried out at atmospheric pressure. It preferably is carried out so as to prevent the absorption of air during the reaction, since molecular oxygen, if absorbed in large quantity, may tend to discolor the product and may also retard the rate of polymerization. The polymerization is usually completed within 10 hours and in some instances may be carried to completion within one hour. The mixture is preferably agitated during the polymerization.

After completing the polymerization, the emulsion is broken in any of the usual ways, e. g. by heating the same or by adding methyl alcohol, ethyl alcohol, propyl alcohol, acetone, ammonia, or by adding salts such as sodium chloride, calcium chloride, etc. whereby the polymer or copolymer is precipitated, usually as a powder. The precipitate is separated, washed free of adhering mother liquor, and dried. The yield of polymer from the method just described is usually high; in some instances quantitative.

*Example 1*

The following table describes the results obtained in a series of experiments on the co-polymerization of vinyl chloride with vinylidene chloride. Certain of the experiments were carried out in aqueous emulsion in accordance with the invention using a mixture of an acid, a peroxide and a ferric compound to catalyze the reaction. For purpose of comparison the table includes other experiments which either (1) were carried out in like manner except that one or more of the essential ingredients of the catalyst was omitted, or (2) were carried out in the presence of the complex catalyst but in solution, using aqueous methanol of 85 per cent by weight concentration as the solvent. In each of the experiments, regardless of how it was conducted, the reaction mixture was treated prior to the polymerization with nitric acid in amount sufficient to reduce its pH value to approximately 2. In the experiments carried out in emulsion, a reaction mixture having the composition given in the table was agitated until emulsification occurred and acidified with nitric acid to a pH value of 2. The emulsion was then warmed in a closed container at the temperature stated for the time also given to effect the polymerization, after which methanol was added to precipitate the co-polymer which was separated by filtration, dried, and weighed. In each of the other experiments a solution having the composition stated was prepared and acidified with nitric acid to a pH value of 2. The solution was then maintained at the polymerizing temperature stated for the time given, after which it was diluted with water to precipitate the co-polymer product. The latter was separated from the mixture and dried and weighed. The table gives the initial composition of each reaction mixture (except for the nitric acid) in per cent by weight of each ingredient, states the conditions of time and temperature employed in effecting the polymerization, and gives the per cent yield of co-polymer in each instance.

*Table*

| Run No. | Type of run | Reaction mixture | | | | | | | Polymerizing conditions | | Percent yield |
|---|---|---|---|---|---|---|---|---|---|---|---|
| | | Medium | | Vinyl chloride, percent | Vinylidene chloride, percent | $H_2O_2$, percent | $FeCl_3$, percent | Nopco, percent | Time, hours | Temp., °C. | |
| | | Kind | Percent | | | | | | | | |
| 1 | Solution | Methanol | 50 | 13.5 | 37.4 | 0.13 | 0.005 | None | 216 | 40 | 55 |
| 2 | do | do | 50 | 25.0 | 25.0 | 0.13 | 0.005 | None | 216 | 40 | 32 |
| 3 | do | do | 50 | 37.4 | 13.5 | 0.13 | 0.005 | None | 216 | 40 | 70 |
| 4 | Emulsion | $H_2O$ | 72.7 | 3.6 | 21.8 | 0.11 | None | 1.8 | 24 | 40 | 33 |
| 5 | do | do | 75.2 | 2.21 | 19.89 | 0.013 | 0.004 | 2.21 | 24 | 40 | 92 |
| 6 | do | do | 75.2 | 5.52 | 16.55 | 0.013 | 0.004 | 2.21 | 24 | 40 | 82 |
| 7 | do | do | 75.2 | 11.05 | 11.05 | 0.013 | 0.004 | 2.21 | 24 | 40 | 70 |
| 8 | do | do | 75.2 | 11.05 | 11.05 | 0.013 | 0.004 | 2.21 | 45 | 40 | 100 |
| 9 | do | do | 75.2 | 16.55 | 5.52 | 0.013 | 0.004 | 2.21 | 24 | 40 | 60 |
| 10 | do | do | 75.2 | 16.55 | 5.52 | 0.013 | 0.004 | 2.21 | 45 | 40 | 100 |
| 11 | do | do | 75.2 | 19.89 | 2.21 | 0.013 | 0.004 | 2.21 | 24 | 40 | 76 |

In the table, from a comparison of runs 1–3 with runs 5–7 it will be seen that the catalytic co-polymerization is more nearly complete when carried out for only 24 hours in aqueous emulsion than when carried out at the same temperature for 216 hours in an aqueous methanol solution. Comparison of run 4 with runs 5–6 shows that the catalytic co-polymerization in emulsion occurs far more readily when carried out in the presence of an acid, a peroxide, and a ferric compound than when carried out under similar conditions, except that the ferric compound is omitted. Runs 8 and 10 demonstrate that the polymerization may be carried out quantitatively when operating in accordance with the invention and that the time required for complete reaction is not excessive. Runs 5–11 show that the catalytic co-polymerization in emulsion takes place rapidly regardless of the relative proportions of vinyl chloride and vinylidene chloride used.

Example 2

The purpose of this example is to demonstrate that during a co-polymerization in aqueous emulsion in accordance with the invention, the co-polymer formed at the start of the reaction is of approximately the same composition as that formed in later stages of the reaction. Two identical emulsified reaction mixtures were prepared. Each contained 75.2 per cent by weight of water, 16.55 per cent of vinylidene chloride, 5.52 per cent of vinyl chloride, 2.21 per cent of Nopco, 0.013 per cent of hydrogen peroxide, 0.004 per cent of ferric chloride and sufficient nitric acid to reduce the pH of the emulsion to 2. One of the emulsions was heated to 40° C. in a closed container for 5 hours, whereby only 8 per cent by weight of mixture of vinyl chloride and vinylidene chloride was polymerized, and the other emulsion was heated at 40° C. for 15 hours, whereby 80 per cent of the vinyl chloride and vinylidene chloride mixture was polymerized. Each emulsion was treated with methanol to precipitate the polymerized product and the latter was separated and analyzed to determine molecular ratio of vinyl chloride to vinylidene chloride making up the same. Each product contained vinyl chloride and vinylidene chloride combined in the ratio of 2.68 moles of vinylidene chloride per mole of vinyl chloride.

In similar manner other vinyl halides and vinylidene halides may be co-polymerized in aqueous emulsion using the new complex catalysts. Examples of other such co-polymers which may advantageously be prepared by the present method are co-polymers of vinyl chloride with vinylidene bromide, co-polymers of vinyl bromide with vinylidene chloride, co-polymers of vinyl bromide with vinylidene bromide, and co-polymers of either vinyl chloride or vinyl bromide with vinylidene chlorobromide.

Other modes of applying the principle of our invention may be employed instead of the one explained, change being made as regards the method herein disclosed, provided the step or steps stated by any of the following claims or the equivalent of such stated steps be employed.

We therefore particularly point out and distinctly claim as our invention:

1. The method which comprises forming an aqueous emulsion of a vinyl halide and a vinylidene halide, which emulsion also contains as ingredients thereof small proportions of a water-soluble acid, a per-oxygen compound, and a ferric compound, and co-polymerizing the vinyl halide and vinylidene halide while in the emulsion.

2. The method which comprises forming an aqueous emulsion of a vinyl halide and a vinylidene halide, which emulsion also contains as ingredients thereof small proportions of a water-soluble acid, a peroxide, and a ferric compound, and co-polymerizing the vinyl halide and vinylidene halide while in the emulsion.

3. In a method of forming a co-polymer of a vinyl halide and a vinylidene halide, the steps of preparing an aqueous emulsion of the vinyl halide and vinylidene halide, which emulsion also contains, as ingredients thereof, a water-soluble acid in amount sufficient to reduce the pH value to below 6 and small proportions of a peroxide and a ferric compound, and co-polymerizing the vinyl halide and the vinylidene halide while in the emulsion.

4. The method which comprises forming an aqueous emulsion of a vinyl halide and a vinylidene halide, which emulsion also contains as ingredients thereof, small proportions of hydrogen peroxide, a ferric compound, and a water-soluble acid in amount sufficient to reduce the pH value of the emulsion to between 1.5 and 3, co-polymerizing the vinyl halide and vinylidene halide while in said emulsion, and separating the polymerized product from the mixture.

5. The method which comprises forming an aqueous emulsion of vinyl chloride and vinylidene chloride, which emulsion also contains as ingredients thereof small proportions of a water-soluble acid, a peroxide and a ferric compound, and co-polymerizing the vinyl chloride and vinylidene chloride while in the emulsion.

6. The method which comprises forming an aqueous emulsion of vinyl chloride and vinylidene chloride, which emulsion also contains as ingredients thereof small proportions of hydrogen peroxide, a ferric compound, and a water-soluble acid in amount sufficient to reduce the pH value of the emulsion to below 6, and co-polymerizing the vinyl chloride and vinylidene chloride while in the emulsion.

7. The method which comprises forming an aqueous emulsion of vinyl chloride and vinylidene chloride, which emulsion also contains, as ingredients thereof, a water-soluble acid in amount sufficient to reduce the pH value of the emulsion to between 1.5 and 3 and small proportions of hydrogen peroxide and a ferric compound, co-polymerizing the vinyl chloride and vinylidene chloride while in said emulsion, and separating the polymerized product.

EDGAR C. BRITTON.
CLYDE W. DAVIS.